United States Patent
Kile (10) Patent No.: US 11,064,656 B1
(45) Date of Patent: Jul. 20, 2021

(54) COMBINE CHAFFER WITH CHAFFER DAM

(71) Applicant: Ronald J. Kile, Rosalia, WA (US)

(72) Inventor: Ronald J. Kile, Rosalia, WA (US)

(*) Notice: Subject to any disclaimer, the term of this patent is extended or adjusted under 35 U.S.C. 154(b) by 0 days.

(21) Appl. No.: 17/086,720

(22) Filed: Nov. 2, 2020

(51) Int. Cl.
| *A01F 12/44* | (2006.01) |
| *A01D 41/127* | (2006.01) |
| *A01F 12/30* | (2006.01) |

(52) U.S. Cl.
CPC ........ *A01F 12/448* (2013.01); *A01D 41/1276* (2013.01); *A01F 12/44* (2013.01); *A01F 12/444* (2013.01); *A01F 12/446* (2013.01); *A01F 12/30* (2013.01)

(58) Field of Classification Search
CPC ...... A01F 12/448; A01F 12/446; A01F 12/44; A01F 12/444; A01F 12/30; A01D 41/1276

See application file for complete search history.

(56) References Cited

U.S. PATENT DOCUMENTS

| 1,785,195 A | | 12/1930 | Hoes et al. | |
|---|---|---|---|---|
| 2,649,760 A | | 8/1953 | Gustofson | |
| 3,664,349 A | | 5/1972 | Quick | |
| 3,800,803 A | * | 4/1974 | Rouse | A01F 12/446 460/101 |
| 4,471,788 A | * | 9/1984 | Meier | A01F 12/44 460/29 |
| 4,480,643 A | * | 11/1984 | Alm | A01F 12/446 460/120 |
| 4,531,528 A | * | 7/1985 | Peters | A01F 12/44 460/97 |
| 4,696,151 A | | 9/1987 | Hobbs | |
| 5,041,059 A | | 8/1991 | Ricketts et al. | |
| 5,176,574 A | | 1/1993 | Matousek et al. | |
| 5,795,223 A | * | 8/1998 | Spiesberger | A01F 12/448 460/102 |
| 6,790,137 B2 | | 9/2004 | Gorden | |
| 7,357,711 B1 | * | 4/2008 | Matousek | A01F 12/446 209/408 |
| 7,497,775 B1 | * | 3/2009 | Claerhout | A01F 12/446 460/101 |
| 8,282,453 B1 | * | 10/2012 | Hillen | A01D 41/1276 460/13 |
| 10,143,135 B2 | * | 12/2018 | Xu | A01F 12/48 |
| 2014/0128133 A1 | * | 5/2014 | Claerhout | A01F 12/446 460/101 |

(Continued)

FOREIGN PATENT DOCUMENTS

| EP | 1348331 A1 * | 10/2003 | .......... A01F 12/448 |
|---|---|---|---|
| KR | 2016133587 A * | 10/2016 | .......... A01F 12/305 |
| WO | WO-2010061668 A1 * | 6/2010 | .......... A01F 12/448 |

*Primary Examiner* — Arpad Fabian-Kovacs
(74) *Attorney, Agent, or Firm* — Parsons & Goltry, PLLC; Michael W. Goltry; Robert A. Parsons (57) ABSTRACT

A cleaning system for an agricultural combine includes a cleaning shoe including a chaffer having an upstream extremity and a downstream extremity, a cleaning fan for establishing a flow of air upwardly through the chaffer, and a transverse chaffer dam mounted proximate to the downstream extremity transversely obstructing a crop layer flow path extending over the chaffer from the upstream extremity to the downstream extremity while permitting air and threshed crop material to flow thereover and thereunder through a transverse opening between the chaffer dam and the downstream extremity.

13 Claims, 8 Drawing Sheets

(56) References Cited

U.S. PATENT DOCUMENTS

| | | | |
|---|---|---|---|
| 2014/0370947 A1* | 12/2014 | Bilde | A01F 12/44 |
| | | | 460/91 |
| 2016/0050849 A1* | 2/2016 | Schuerman | B07B 1/12 |
| | | | 460/101 |
| 2016/0353663 A1 | 12/2016 | Stahl | |
| 2017/0150678 A1* | 6/2017 | Li | A01D 41/12 |
| 2018/0235152 A1* | 8/2018 | Kristensen | A01F 12/305 |
| 2019/0174678 A1* | 6/2019 | Puryk | A01F 12/442 |
| 2019/0320588 A1* | 10/2019 | Vanstaen | A01F 12/46 |

\* cited by examiner

COMBINE CHAFFER WITH CHAFFER DAM

FIELD OF THE INVENTION

The present invention relates to combines.

More particularly, the present invention relates to combine cleaning systems.

In a further and more specific aspect, the present invention relates to chaffers of combine cleaning systems.

BACKGROUND OF THE INVENTION

Known combines are available in various designs and models to perform the essential functions of harvesting, threshing, and cleaning grain. The term "grain" used herein includes corn, wheat, rye, oats, barley, flaxseed, sorghum, soybeans, mixed grain, and other food grains, feed grains, and oilseeds. A standard combine includes a crop harvesting apparatus or header at the forward end of the combine, which reaps planted grain stalks. An infeed mechanism operates in conjunction with the harvesting apparatus and feeds the grain stalks to a separating apparatus, which separates the grain from the material other than grain, which includes the chaff, the husks of grains and grasses that are separated during threshing. While the separating apparatus separates most of the grain from the chaff, some chaff remains intermixed with the grain, thereby necessitating a further cleaning or separating action achieved by a cleaning shoe or section of the combine.

The cleaning section receives the grain and chaff expelled from the separating apparatus. It typically includes a fan and two reciprocally mounted and vertically spaced apart sieves. The upper sieve is called a chaffer. Each sieve usually includes a series of adjacent louvers. A series of transversely elongated openings or passages are present between the adjacent louvers. The openings serve to grade the material by size such that smaller grains fall through the openings, and larger pieces of material move rearward and off the sieves and outwardly through the back of the combine.

The fan produces a flow of air directed upwardly through the sieves. Reciprocation of the sieves consolidates the grain and the chaff into rearward moving crop layer or mat atop the chaffer, a conglomerate mass of clean grain and chaff rearward moving along a crop layer flow path over the chaffer. Air from the fan blowing upwardly through the passages between the louvered sieves separates the grain from the chaff that make up the crop layer. The upwardly directed air creates a force that urges the chaff to float on top of the chaffer and into an airborne state such that it may be directed toward and expelled from a discharge end of the combine. The heavier seeds or clean grain fall through the openings of the sieves into a clean grain collector.

A substantial amount of grain and chaff passes to the cleaning section of the combine from the separating apparatus to form the resulting rearward moving crop layer or mat atop the chaffer. Accordingly, the fan is effective to produce an efficient and substantial flow of air to effectuate a desired cleaning action for the threshed crop material in the rearward moving crop layer. Problematically, however, the flow of air passing upwardly through the chaffer into the crop layer often blows it off the chaffer and turbulates through the housing urging the grain and the chaff into an airborne state and carries the both grain and chaff outwardly through the back of the chaffer resulting in unwanted grain loss, thereby necessitating continued improvement in the art.

SUMMARY OF THE INVENTION

According to the principle of the invention, A cleaning system for an agricultural combine includes a cleaning shoe including a chaffer having an upstream extremity and a downstream extremity, a cleaning fan for establishing a flow of air upwardly through the chaffer, and a transverse chaffer dam mounted proximate to the downstream extremity transversely obstructing a crop layer flow path extending over the chaffer from the upstream extremity to the downstream extremity while permitting air and threshed crop material to flow thereover and thereunder through a transverse opening between the chaffer dam and the downstream extremity. The chaffer dam is longitudinally straight and perpendicular to the crop layer flow path. The chaffer dam is mounted directly to the chaffer. The chaffer additionally includes a first side and a second side extending between the upstream extremity and the downstream extremity, and the transverse opening extends between a first end of the chaffer dam proximate to the first side of the chaffer and a second end of the chaffer dam proximate to the second side of the chaffer.

According to the principle of the invention, a cleaning system for an agricultural combine includes a cleaning shoe including a chaffer having a first side and a second side extending between an upstream extremity and a downstream extremity, a cleaning fan for establishing a flow of air upwardly through the chaffer, and a chaffer dam proximate to the downstream extremity and extending transversely from a first end mounted to the first side of the chaffer to a second end mounted to the second side of the chaffer, the chaffer dam transversely obstructing a crop layer flow path extending over the chaffer from the upstream extremity to the downstream extremity while permitting air and threshed crop material to flow thereover and thereunder through a an opening between the chaffer dam and the downstream extremity and that extends transversely between the first end of the chaffer dam and the second end of the chaffer dam. The chaffer dam is longitudinally straight and perpendicular to the crop layer flow path between the first end and the second end.

In a cleaning system for an agricultural combine comprising a cleaning shoe including a chaffer having a upstream extremity and a downstream extremity, and a cleaning fan for establishing a flow of air upwardly through the chaffer, a method according to the principle of the invention includes mounting a chaffer dam transversely proximate to the downstream extremity, the chaffer dam transversely obstructing a crop layer flow path extending over the chaffer from the upstream extremity to the downstream extremity while permitting air and threshed crop material to flow thereover and thereunder through a transverse opening between the chaffer dam and the downstream extremity. The chaffer dam is longitudinally straight and perpendicular to the crop layer flow path. The step of mounting the chaffer dam includes mounting the chaffer dam directly to the chaffer. The chaffer additionally includes a first side and a second side extending between the upstream extremity and the downstream extremity, and the transverse opening extends between a first end of the chaffer dam proximate to the first side of the chaffer and a second end of the chaffer dam proximate to the second side of the chaffer.

In a cleaning system for an agricultural combine comprising a cleaning shoe including a chaffer having a first side and a second side extending between an upstream extremity and a downstream extremity, and a cleaning fan for establishing a flow of air upwardly through the chaffer, a method according to the principle of the invention includes transversely extending a chaffer dam proximate to the downstream extremity from a first end of the chaffer dam proximate to the first side of the chaffer to a second end of the chaffer dam proximate to the second side of the chaffer, the chaffer dam transversely obstructing a crop layer flow path extending over the chaffer from the upstream extremity to the downstream extremity while permitting air and threshed crop material to flow thereover and thereunder through an opening between the chaffer dam and the downstream extremity and that extends transversely between the first end of the chaffer dam and the second end of the chaffer dam. The step of transversely extending the chaffer additionally includes mounting the first end of the chaffer dam to the first side of the chaffer and mounting the second end of the chaffer to the second side of the chaffer. The chaffer dam is longitudinally straight and perpendicular to the crop layer flow path between the first and second end.

BRIEF DESCRIPTION OF THE DRAWINGS

Referring to the drawings.

DETAILED DESCRIPTION

Figure 1:
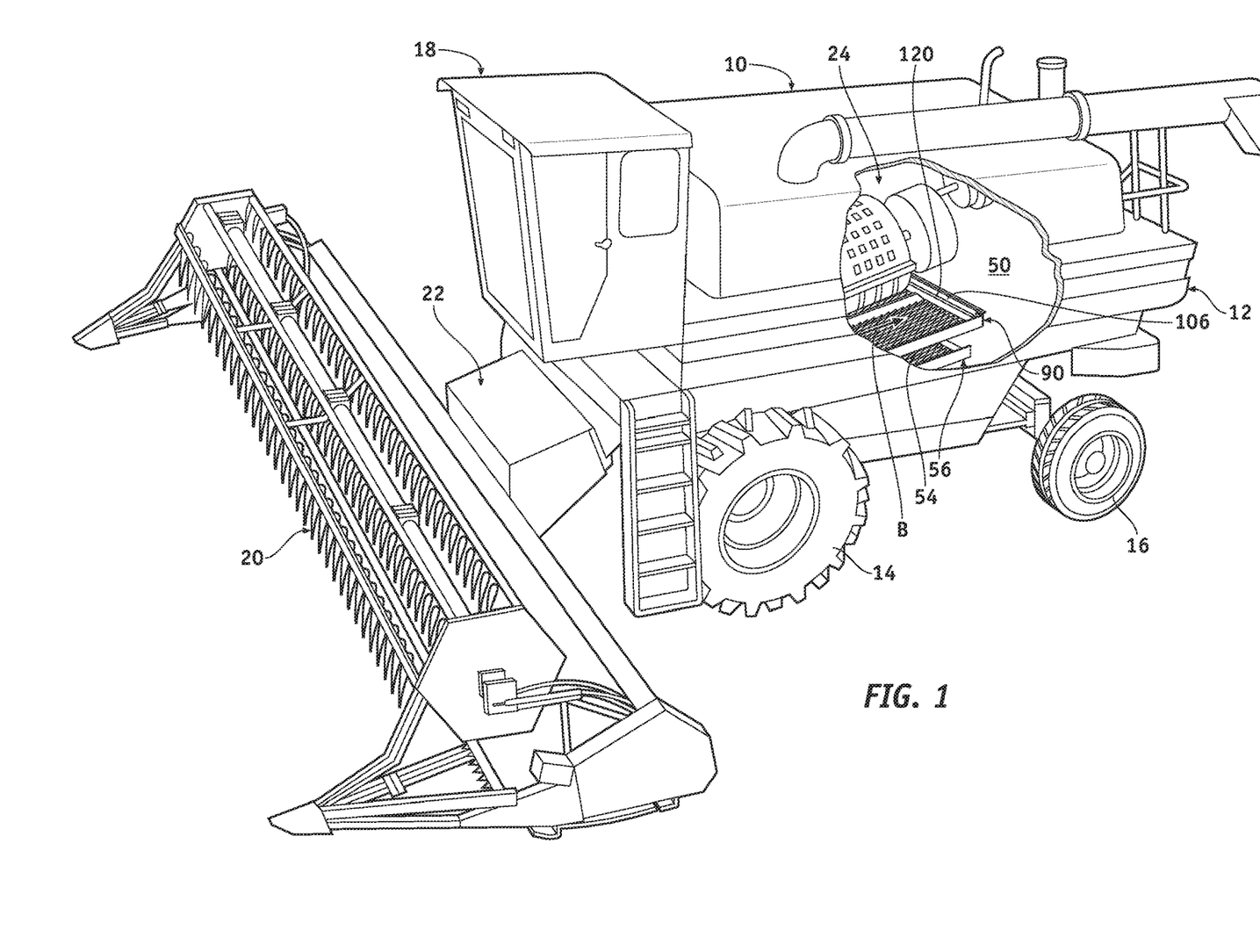
FIG. 1 is a perspective view of a combine, with portions thereof broken away illustrating a separator apparatus and a cleaning shoe including a chaffer configured with a chaffer dam in accordance with the principle of the invention.

Turning now to the drawings, in which like reference characters indicate corresponding elements throughout the several views, shown in FIG. 1 is a self-propelled combine 10. Combine 10 includes a body or housing 12 supported on a wheeled chassis including front drive wheels 14 and steerable rear wheels 16. An engine (now shown) powers combine 10, which is controlled from an operator cab 18 in the customary manner. Attached at the forward end of combine 10 are a standard crop harvesting apparatus or header 20 and an infeed mechanism or feederhouse 22. Header 20 gathers and cuts the crop and transports the cut crop material to feederhouse 22 open to a separator apparatus 24 enclosed by housing 12. Feederhouse 22 feeds the crop material to separator apparatus 24.

Figures 2, 3:
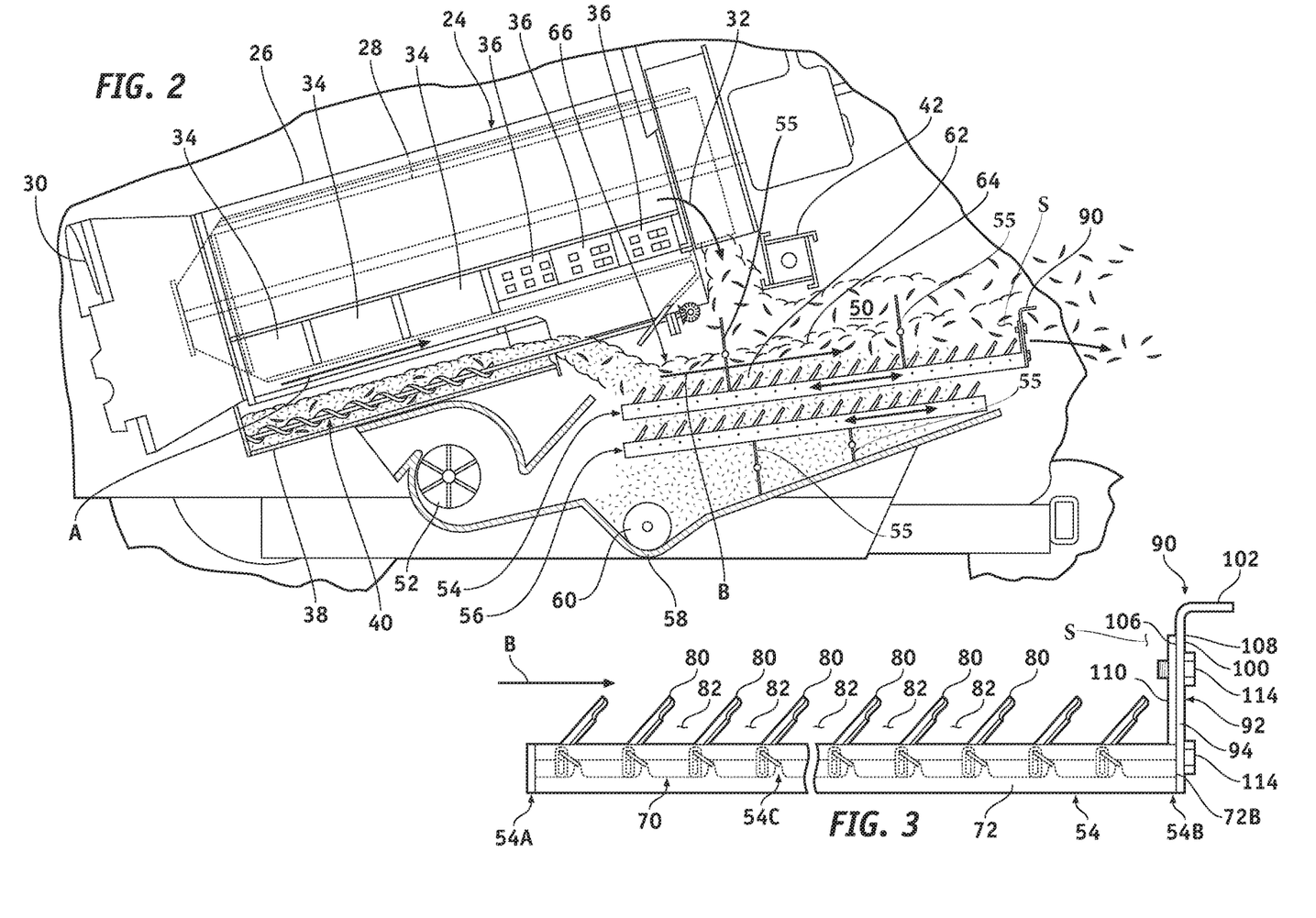
FIG. 2 is an enlarged partial cross-section side elevation view of the separator apparatus and the cleaning shoe of FIG. 1.
FIG. 3 is a side elevation view of the chaffer of FIGS. 1 and 2.
Figure 4:
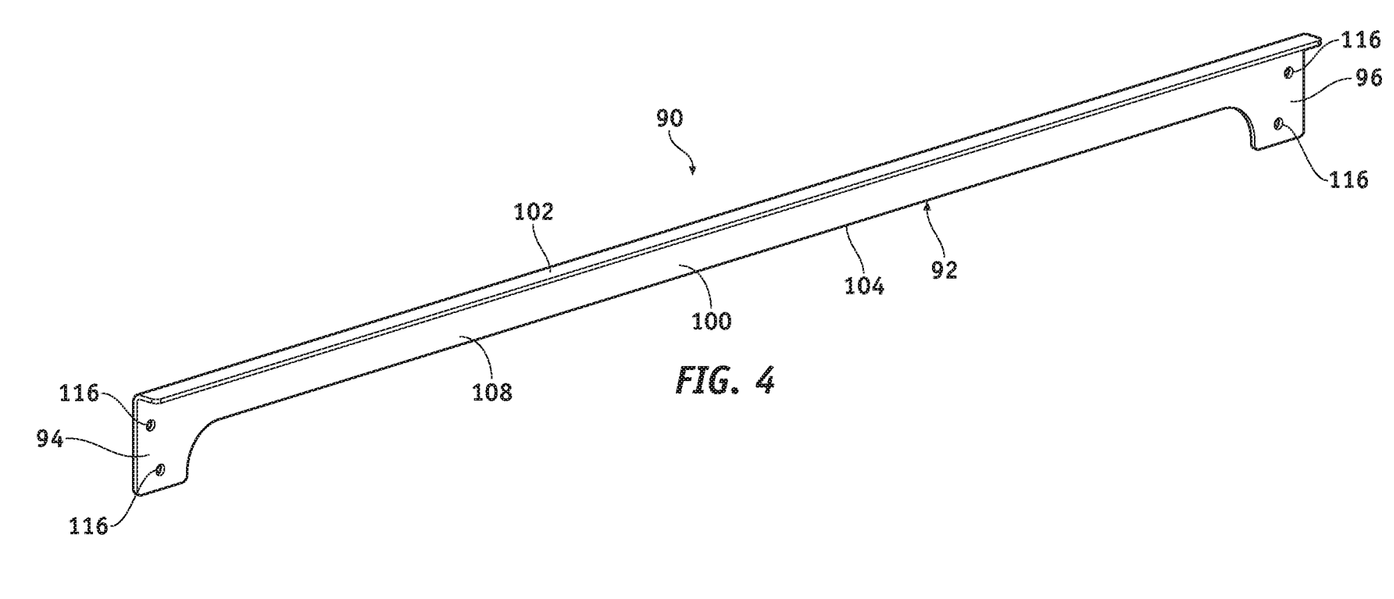
FIG. 4 is a perspective view of the chaffer dam of FIGS. 1-3.
Figure 5:
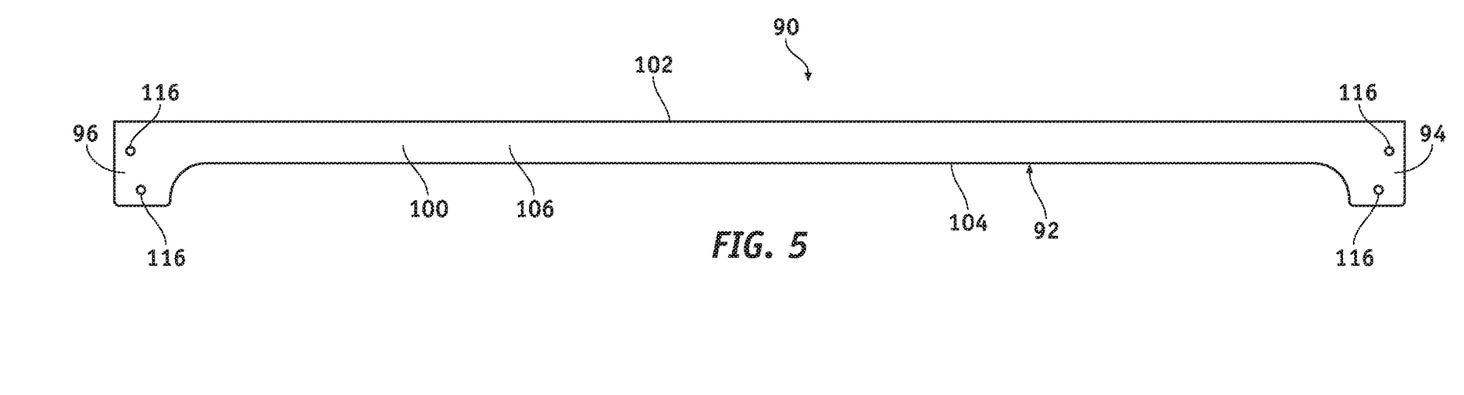
FIG. 5 is a front elevation view of the chaffer dam of FIG. 4.
Figure 6:
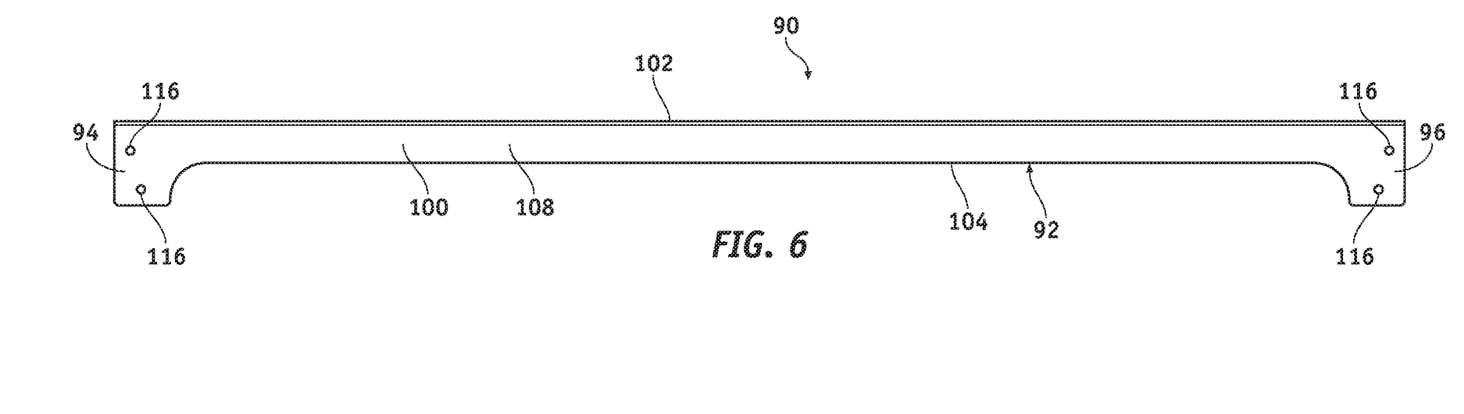
FIG. 6 is a rear elevation view of the chaffer dam of FIG. 4.

Separating apparatus 24 shown in FIG. 2 is a standard axial-flow type and includes a threshing cage 26 and a rotor 28. The principles of the present invention equally apply to combines having a separating apparatus other than the axial-flow type. Threshing cage 26 has a generally cylindrically and at least partially foraminous configuration with rotor 28 mounted for rotation therewithin as is standard in the art. Rotor 28 is driven from the combine 10 engine and transports crop material to be threshed from an intake or upstream end 30 of separating apparatus 24 to a discharge or downstream end 32 of separating apparatus 24.

The crop material is threshed between intake end 30 and discharge end 32 of separating apparatus 24 as it spirals around the single large diameter rotor 28 and passes through the threshing cage 26. Suitable threshing implements on rotor 28 cooperate respectively with semi-cylindrical concaves 34 and semi-cylindrical grates 36 provided on the threshing cage 26 to thresh the crop material such that most of the grain is separated and propelled downwardly through concaves 34 and grates 36.

Most of the grain drops into a grain pan 38 under concaves 34 and grates 36. Auger mechanism 40 conveys the grain rearwardly from grain pan 38 in a direction of arrow A to the cleaning system of combine 10 operable for separating the grain from the chaff and material other than grain. The chaff and material other than grain are impelled rearwardly out of the discharge end 32 of the separating apparatus 24 where a rotary beater 42 throws the straw and other waste material rearwardly from combine 10. While separating apparatus 24 acts to separate a substantial portion of the grain from the chaff, some chaff is directed through the openings in separating apparatus 24 into grain pan 38 along with the grain and a further cleaning or separating action is required.

The cleaning system receives grain and chaff from gran pan 38 and cleans chaff and material other than grain, such as straw, tailings and other foreign matter, from the clean grain. The cleaning system includes a cleaning shoe 50 and a cleaning fan 52 for establishing a flow of air through cleaning shoe 50. Cleaning shoe 50 includes vertically spaced-apart cleaning sieves, including a chaffer 54 vertically spaced over an underlying grain sieve 56, and a trough 58 associated with a suitable auger mechanism 60. Chaffer 54 and grain sieve 56 receive grain 62 and chaff 64 from grain pan 38. The grain 62 and chaff 64 move downwardly over sieves 54 where the chaff is separated from the grain 62 that falls through chaffer 54 and grain sieve 56 into the underlying trough 58. Auger mechanism 60 transports the clean grain from trough 58 into a hopper or bulk tank (not shown) of combine 10.

Fan 52 transversely mounted for rotation within housing 12 beneath separator apparatus 24 ahead of cleaning sieves 54 and 56 establishes a flow of air rearwardly and upwardly through the grain sieve 56 and chaffer 54. The standard oscillation of grain sieve 56 and chaffer 54 consolidates grain 62 and chaff 64 into a rearward moving crop layer or mat 66 atop chaffer 54. The crop layer 66 is a conglomerate mass of clean grain 62 and chaff 64 downstream or rearward moving along a crop layer flow path B over chaffer 54 in FIG. 2 in a direction from an upstream end or extremity 54A of chaffer 54 adjacent to grain pan 38 to a downstream end or extremity 54B of chaffer 54 located toward the rear of combine 10. Air from fan 52 blowing upwardly through grain sieve 56 and chaffer 54 separates grain 62 from chaff 64 that make up crop layer 66. The upwardly directed air creates an inherent force. This force urges chaff 64 to float on top of chaffer 54 in the crop layer flow path B in the path of the air being blow through grain sieve 56 and chaffer 54 by fan 52 and into an airborne state enabling its expulsion out the back of combine 10 through its discharge end. Simultaneously, the comparatively heavier clean grain 62 fall through chaffer 54 and grain sieve 56 into trough 58. Auger mechanism 60 transports the clean grain from trough 58 to the hopper or bulk tank.

Chaffer 54 and grain sieve 56 supported in housing 12 beneath separating apparatus 24 receive and sift threshed grain received from grain pan 38. Chaffer 54 and grain sieve 56 are suitably located in housing 12 to enable the flow of air from fan 52 to pass upwardly therethrough to urge residue in the threshed grain into an airborne state and toward discharge 32 of separating apparatus 24. Chaffer 54 and sieve 56 are each supported for fore-and-aft reciprocation or oscillation by arms 55 according to standard practice. The oscillation of chaffer 54 and grain sieve 56 facilitates the arrangement of the crop material over chaffer 54 and grain sieve 56 for separating the clean grain 62 from chaff 64 and any straw, tailings, and other residue materials so that the clean grain falls through chaffer 54 and grain sieve 56 and into the underlying trough 58. Chaffer 54 and grain sieve 56 are substantially similar in construction to each other. Accordingly, chaffer 54 is discussed briefly below with the understanding that the discussion of chaffer 54 applies in every respect to grain sieve 56 except for the chaffer dam associate with chaffer 54 as described below.

Figure 7:
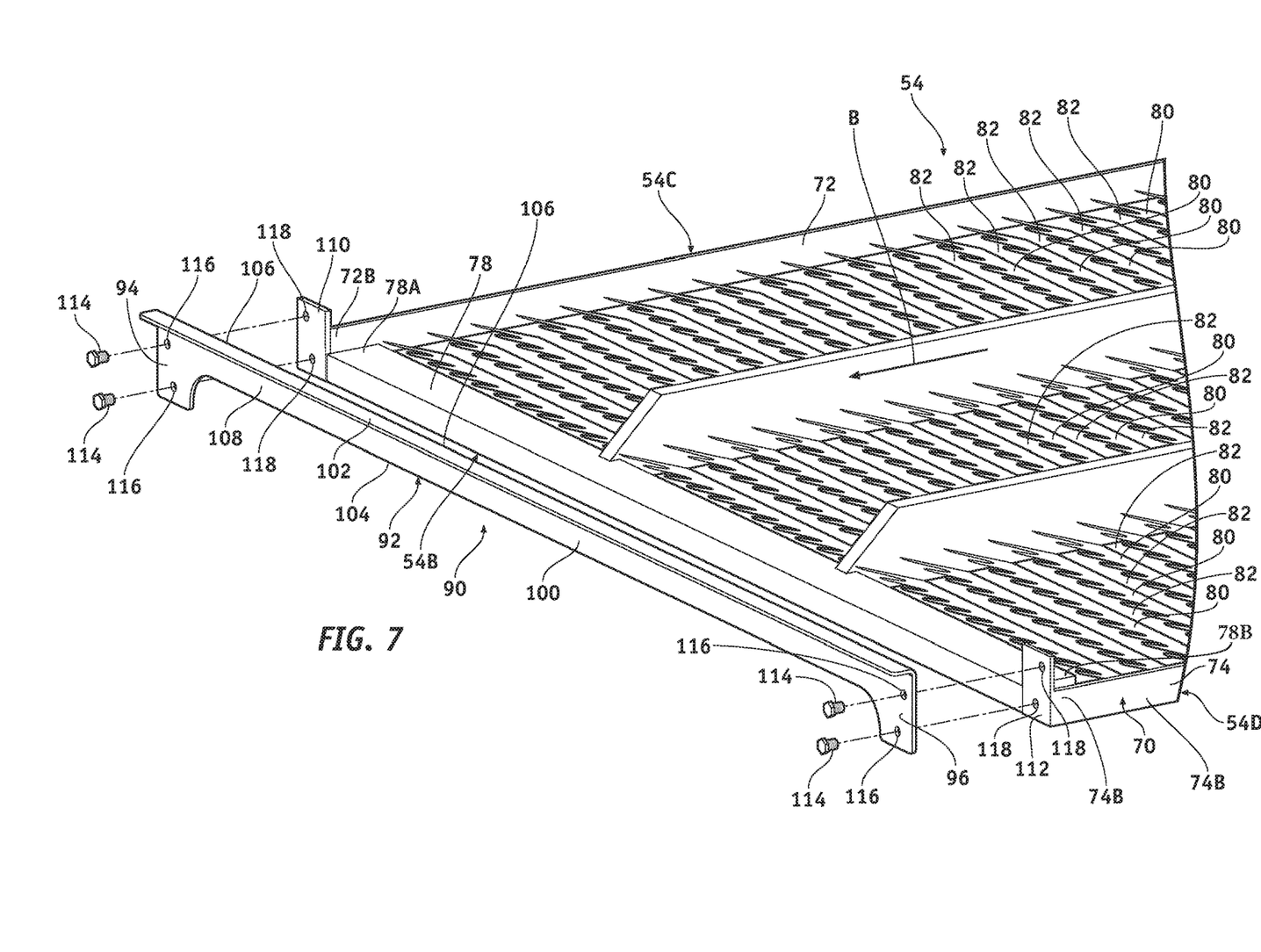
FIG. 7 is a fragmentary view of the chaffer of FIGS. 1-3 showing the chaffer dam detached from the chaffer.
Figure 8:
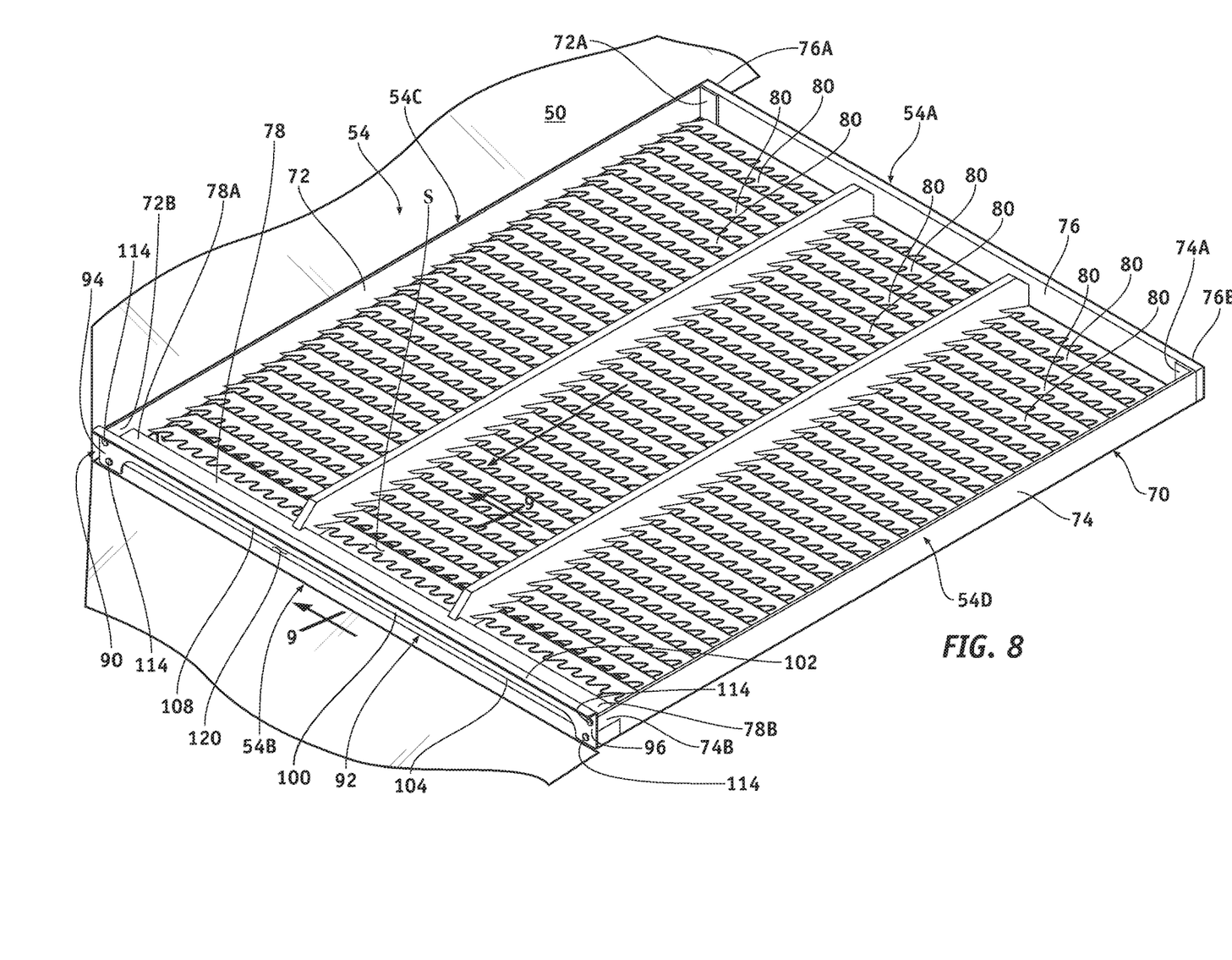
FIG. 8 is a perspective view corresponding to FIG. 7 illustrating the chaffer dam attached to the chaffer.

Turning in relevant part to FIGS. 7 and 8, chaffer 54 includes a generally rectangular frame 70 of metal. Frame 70 includes opposite side rails 72 and 74 extending between an upstream rail 76 and an opposite downstream rail 78. Side rails 72 and 74 are parallel to one another and are perpendicular relative to upstream and downstream rails 76 and 78. Upstream and downstream rails 76 and 78 are parallel to one another. Side rails 72 and 74 are at the opposite sides of chaffer 54. Upstream rail 72 is at the upstream end/extremity of chaffer 54, and downstream rail 78 is at the downstream end/extremity of chaffer 54. The upstream and downstream ends/extremities of chaffer 54 are denoted generally at 54A and 54B, respectively, and the opposite sides of chaffer 54 are denoted generally at 54C and 54D, respectively. Side rails 72 and 74 are equal in length, upstream and downstream rails 76 and 78 are equal in length, and side rails 72 and 74 are somewhat longer than upstream and downstream rails 76 and 78. This characterizes the generally rectangular configuration of frame 70 and chaffer 54. Accordingly, chaffer 54 has a length from upstream extremity 54A to opposite downstream extremity 54B and a width from side 54C to opposite side 54D, in which the width of chaffer 54 is less than the length of chaffer 54.

Side rail 72 at side 54C of chaffer 54 has an upstream end 72A and an opposed downstream end 72B, side rail 74 at side 54D of chaffer 54 has an upstream end 74A and an opposed downstream end 74B, upstream rail 76 at upstream extremity 54A of chaffer 54 has opposed ends 76A and 76B, and downstream rail 78 at downstream side 54D of chaffer 54 has opposed ends 78A and 78B. Upstream ends 72A and 74A of the respective side rails 72 and 74 are rigidly affixed to the respective ends 76A and 76B of upstream rail 76 at upstream extremity 54A of chaffer 54. Side rails 72 and 74 extend forwardly or downstream along the opposite sides 54C and 54D of chaffer 54 from their respective upstream ends 72A and 74A to their respective downstream ends 72B and 74B rigidly affixed to the respective ends 78A and 78B of downstream rail 78 at downstream extremity 54B of chaffer 54.

Figure 9:
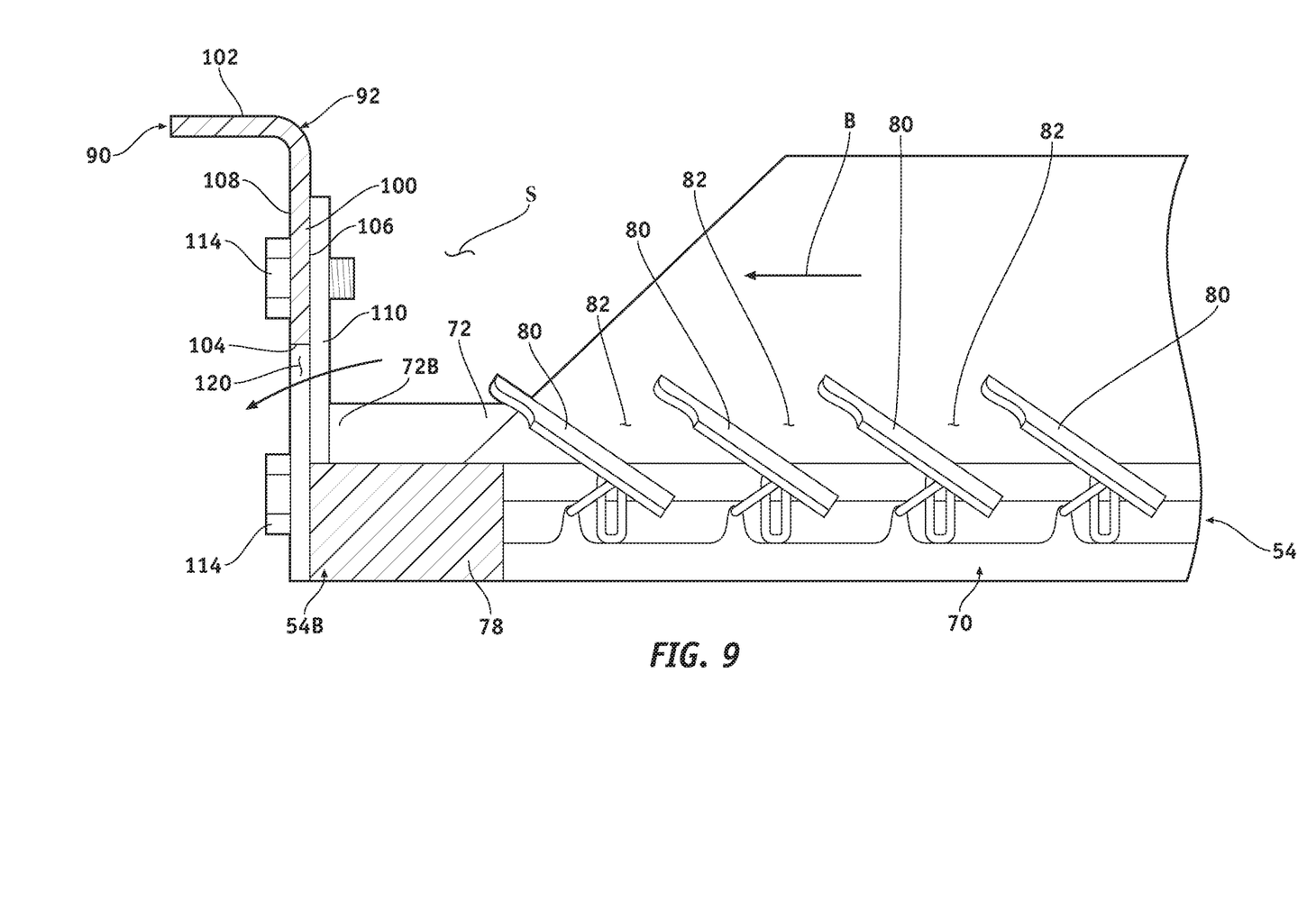
FIG. 9 is a section view taken along line 9-9 of FIG. 8.
Figure 10:
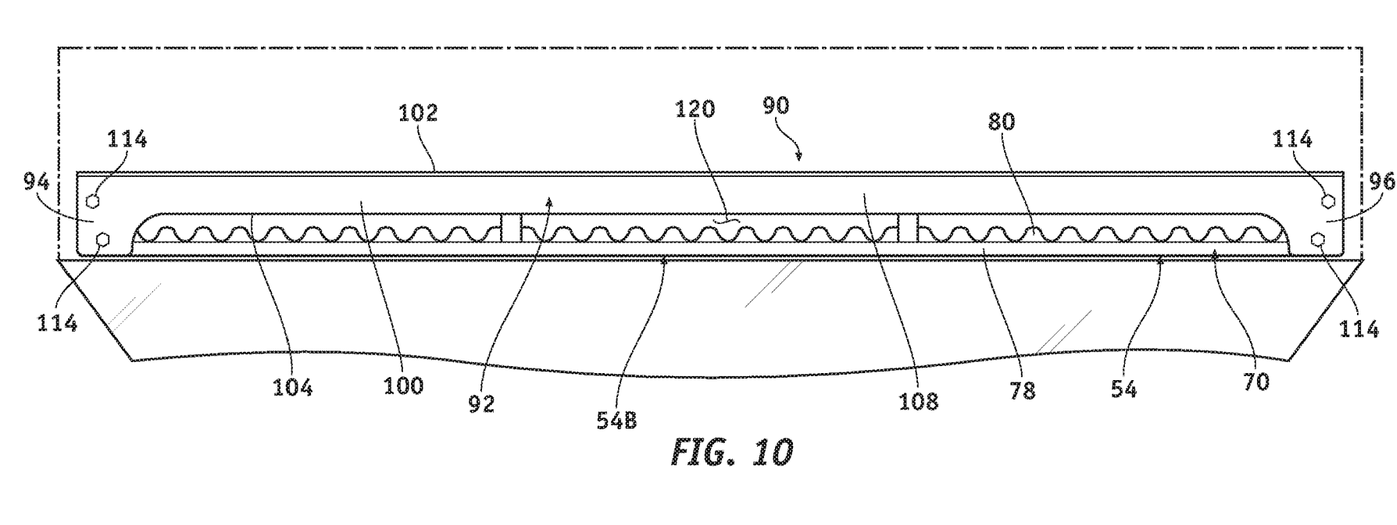
FIG. 10 is a downstream end elevation view of embodiment of FIG. 8.

Frame 70 supports a series of standard, transversely elongate louvers or slats 80 arranged in an adjacent relationship to each other in an angularly offset relationship. The angular disposition of louvers 80 is adjustable according to standard practice. Referring to FIGS. 3, 7, and 9, adjacent louvers 80 define a series of clean grain passages 82 through which grain falls. As is known in the art, each grain passage 82 is relatively narrow in a first or widthwise direction and is transversely elongated in a lengthwise second direction, with the second direction extending generally at right angles or normal to the first direction. The widthwise dimension of the clean grain passages 82 is adjustable by modulating the angular displacement of louvers 80 relative to each other. This is a standard configuration well known in the art.

In FIGS. 1-3, 8, 9, and 10, chaffer 54 incorporates a transversely elongate chaffer dam 90 in accordance with the principle of the invention. Chaffer dam 90 is mounted proximate to downstream extremity 54B of chaffer 54 and extends transversely from side 54C of chaffer 54 to side 54D of chaffer 54. Chaffer dam 90 transversely obstructs, i.e. intersects, crop layer flow path B extending over louvers 80 of chaffer 54 in a direction from upstream extremity 54A to downstream extremity 54B and simultaneously permits air and threshed crop material to flow thereover and thereunder through a transversely elongate gap or opening 120 between chaffer dam 90 and downstream extremity 54B.

Referring in relevant part to FIGS. 4-10, chaffer dam 90 is an elongate beam 92. Beam 92 includes opposed ends 94 and 96 and is longitudinally straight from end 94 to end 96. Beam 92 is a rigid, jointless structural member of steel capable of withstanding load primarily by resisting bending. Beam 92 includes a vertical web 100, an upper flange 102 at an upper end of beam 92, and a lower edge 104 at a lower end of bream 92, all of which extend between the opposed ends 94 and 96. Reference character 102 is used interchangeably to denote both the upper end of beam 92 and the upper flange of beam 92, and reference character 104 is used interchangeably to denote both the lower end of beam 92 and the lower edge of beam 92. Web 94 has upstream side/surface 106 and downstream side/surface 108 and extends upright from lower edge 104 and upper flange 102. Upper flange 102 is horizontal and extends outwardly in opposition to upstream side 106. Ends 94 and 96 are broad, flat parts or extensions of web 100. The length of chaffer dam 90 from end 94 to end 96 is generally equal to the width of chaffer 54 from side 54C to side 54D.

Chaffer dam 90 is preferably mounted directly to frame 70. FIG. 7 shows chaffer dam 90 detached from downstream extremity 54B of frame 70 for illustrative purposes. In this particular embodiment, downstream ends 72A and 74B of side rails 72 and 74 are fashioned with upstanding plates 110 and 112 on either side of chaffer 54. In this example, plates 110 and 112 serve as attachment points for the respective ends 94 and 96 of chaffer dam 90. To attach chaffer dam 90 to downstream extremity 54B of chaffer 54, chaffer dam 90 is oriented upright from lower edge 104 to upper flange 102 and parallel to downstream rail 78 with upstream side 106 facing downstream extremity 54B and ends 94 and 96 confronting the respective plates 110 and 112 on either side of chaffer 54. The downstream side 108 of ends 94 and 96 are presented against the respective plates 110 and 112. Ends 94 and 96 and are secured by suitable bolts 114 to the respective plates 110 and 112. Bolts 114 extend through appropriate holes 116 through ends 94 and 96 of chaffer dam 90 and are threaded into appropriate threaded holes 118 through the respective plates 110 and 112. If desired, the threaded ends extending upstream in opposition to the respective plates 110 and 112 can be fitted with threaded nuts that may be tightened against the upstream side of the respective plates 110 and 112 for added securement. Chaffer dam 90 is shown so mounted to directly to downstream end 54B of frame 70 of chaffer 54 in FIGS. 2, 3, 8, 9, and 10. Bolts 114 enable chaffer 54 to be removed and replaced or repaired as needed. If desired, ends 94 and 96 can be permanently affixed to the respective plates 110 and 112, such as by welding. Once chaffer dam 90 is connected to frame 70 of chaffer 54, it is fixed in place and immovable.

Chaffer dam 90 has no rotating or moving parts and is immovably mounted to frame 70 of chaffer 54. Chaffer dam 90 moves with chaffer 54 as it oscillates during operation. The position/orientation of chaffer dam 90 relative to chaffer 54 does not change while chaffer 54 oscillates during operation. While plates 110 and 112 serve as attachment points for the respective ends 94 and 96 of chaffer dam 90, ends 94 and 96 can be mounted to downstream rail 78 if so desired without departing from the invention. Ends 94 and 96 can also be configured to be mounted to other locations of frame 70 in alternate embodiments consistent with the teachings presented throughout this disclosure.

In the assembly of chaffer dam 90 and chaffer 54 with reference in relevant part to FIGS. 3 and 8-10, chaffer 90 is mounted proximate to downstream extremity 54B and altogether transversely extends longitudinally across the width of downstream extremity 54B of chaffer 54 from side 54C to side 54D transversely obstructing, i.e. intersecting, the crop layer flow path B extending over chaffer 54 from upstream extremity 54A to downstream extremity 54B while permitting air from fan 52 and threshed crop material to flow thereover its upper end 102 and thereunder its lower end 104 through transversely elongate gap or opening 120. Gap or opening 120 is defined between lower end/edge 104 of chaffer dam 90 and downstream rail 78 of downstream extremity 54B of chaffer 54 and extends transversely across substantially the entire width of chaffer 54 between the opposed sides 54C and 54D. More specifically, ends 94 and 96 of chaffer dam 90 are mounted to the respective plates 110 and 112 at the opposite sides 54C and 54D of chaffer 54 at downstream extremity 54B. Chaffer dam 90 extends upright from lower edge 104 to upper flange 102, extends transversely across downstream extremity 54B along the width of chaffer 54 from end 94 connected to plate 110 of downstream end 72B of side rail 72 at side 54C of chaffer 54 to end 96 connected to plate 112 of downstream end 74B of side rail 74 at side 54D of chaffer 54. Chaffer dam 90 is longitudinally straight from end 94 to end 96, and is parallel relative to downstream rail 78 and thus downstream extremity 54B of chaffer 54 and is perpendicular to the opposed sides 54C and 54D of chaffer and to the crop layer flow path indicated by arrow B extending in the direction from upstream extremity 54A to downstream extremity 54B. Upstream side 106 faces upstream against and is perpendicular to the downstream direction of the crop layer flow path B, and downstream side 108 faces downstream in the opposite direction in opposition to upstream side 106. Upstream side 106 resides in and extends transversely across the crop layer flow path B and across the width of chaffer 54 from side 54C to side 54D. Lower edge 104 extending between sides 94 and 96 extends over and is parallel relative to downstream rail 78 of chaffer 54. Lower edge 104 and downstream rail 78 of downstream extremity 54B of chaffer 54 cooperate to define transversely elongate gap or opening 120 at downstream extremity 54B that extends across substantially the entire width of chaffer 54 between ends 94 and 96 at the opposed sides 54C and 54D of chaffer 54.

In operation, header 20 reaps the grain stalks and transports the cut crop material to feederhouse 22 as combine 10 is driven across the field. Feederhouse 22 transports the crop material to inlet end 30 of separating apparatus 24. Separating apparatus 24 threshes the crop material and impels the threshed grain into grain pan 38. Auger mechanism 40 conveys the grain rearwardly from grain pan 38 in direction of arrow A in FIG. 2 to chaffer 54 and grain sieve 56. The chaff and material other than grain are impelled rearwardly out of the discharge end 32 of the separating apparatus 24 where rotary beater 42 throws the straw and other waste material rearwardly from combine 10 from cleaning shoe 50. While separating apparatus 24 acts to separate a substantial portion of the grain from the chaff, some chaff is directed through the openings in separating apparatus 24 into grain pan 38 along with the grain and a further cleaning or separating action is required.

Chaffer 54 and grain sieve 56 receive grain 62 and chaff 64 from grain pan 38. Chaffer 54 and grain pan 56 conventionally oscillate fore-and-aft in coordination with air flowing from fan 52 upwardly through grain sieve 56 and chaffer 54. The air flowing from fan 52 and chaffer 54 oscillation consolidate the grain 62 and chaff 64 into crop layer 66 atop and across the width of chaffer 54 from side 54C to side 54D moving rearwardly along the crop layer flow path B in a downstream direction from the upstream extremity 54A of chaffer 54 to downstream extremity 54B of chaffer 54. Air from fan 52 blowing upwardly through grain sieve 56 and chaffer 54 and into the crop layer 66 separates grain 62 from chaff 64. The upwardly directed air urges chaff 64 to float on top of chaffer 54 in the crop layer flow path B in the path of the air blowing through grain sieve 56 and chaffer 54 by fan 52 and into an airborne state enabling its expulsion out the back of combine 10 through its discharge end. Simultaneously, the comparatively heavier clean grain 62 fall through chaffer 54 and grain sieve 56 into trough 58. Auger mechanism 60 transports the clean grain from trough 58 to the hopper.

Upstream side 106 of chaffer dam 90 residing in and extending transversely across the crop layer flow path B across the width of chaffer 54 from side 54C to side 54D intersects, i.e. lies across, the crop layer 66 moving rearwardly by the combined action of the upwardly directed air from fan 52 and the oscillation of chaffer 54 transversely. Upstream side 106 along the length of chaffer dam 90 from side 54C of chaffer 54 to side 54D of chaffer 54 is additionally perpendicular to the downstream direction of crop layer flow path B and thus intersects crop layer 66 in crop layer flow path B perpendicularly. Upstream side 106 deflects the air from fan 52 in crop layer flow path B sideways, which creates a high-pressure region at space S in front or otherwise upstream of upstream side 106. At the same time, upstream side 106 deflects the rearwardly moving crop layer 66. The deflection of crop layer 66 by upstream side 106 produces an accordion effect in the rearwardly moving crop layer 66 in crop layer flow path B. The sideways deflection of the flow of air from fan 52 in crop layer flow path B accelerates over upper flange 102 at an upper end of chaffer dam 90 and through gap or opening 120 transversely extending under lower edge 104 of chaffer dam 90. The resulting accordion effect caused by the fluctuation in the motion of the rearwardly moving crop layer 66 produced by upstream side 106 intercepting/confronting crop layer flow path B causes disruptions in the downstream flow of crop layer 66 upstream from upstream side 106. The acceleration of the flow of air from fan 52 in crop layer flow path B over upper end 102 and under lower end 104 through gap or opening 120 define air flow pathways from cleaning shoe 50 that favorably influence air turbulence in cleaning shoe 50, which, in turn, favorably influences grain loss through the back of combine 10 by keeping the grain in crop layer 66 flowing downstream toward chaffer dam 90 along crop layer flow path B close to chaffer 54. At the same time, the disruptions in the rearward flow of crop layer 66 in the crop layer flow path B upstream from upstream side 106 of chaffer dam 90 inherently causes the crop layer 66 to loiter along chaffer 54 upstream from chaffer dam 90. The loitering crop layer 66 behind upstream side 106 experiences a more prolonged exposure to the flow of air from fan 52 compared to chaffer 54 without chaffer dam 90 permitting the combined flow of air from fan 52 and the oscillation of chaffer 54 more time to separate grain 62 from chaff 64, which favorably influences grain loss through the back of combine 10. The accelerated flow of air from fan 52 from crop layer flow path B over upper end 102 and under lower end 104 through opening 120 across the width of downstream end 54B of chaffer 54 from end 94 of chaffer dam 90 proximate to side 54C of chaffer 54 to end 96 of chaffer dam 90 proximate to side 54D of chaffer 54 carries with it some of the chaff from crop layer 66. This results in a cleaner gain sample in trough 58 and inherently diminishes air turbulence over both downstream extremity 54B of chaffer 54 and upper end 102 of chaffer dam 90 across the width of chaffer 54 favorably influencing grain loss. Accordingly, the described regulation of the rearward flow of crop layer 66 in the rearward or downstream moving crop layer flow path b and the flow of air from fan 52 by chaffer dam 90 at the downstream extremity 54B of chaffer 54 by chaffer dam 90 favorably influences grain loss and clean grain sampling in trough 58.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A cleaning system for an agricultural combine, comprising:
   a cleaning shoe including a chaffer vertically spaced over an underlying grain sieve and having an upstream extremity and a downstream extremity;
   a cleaning fan for establishing a flow of air upwardly through the chaffer; and
   a transverse chaffer dam mounted proximate to and extending upwardly relative to the downstream extremity transversely obstructing a crop layer flow path extending over the chaffer from the upstream extremity to the downstream extremity while permitting air and threshed crop material to flow thereover and thereunder through a transverse opening between the chaffer dam and the downstream extremity.

2. The cleaning system according to claim 1, wherein the chaffer dam is longitudinally straight and perpendicular to the crop layer flow path.

3. The cleaning system according to claim 1, wherein the chaffer dam is mounted directly to the chaffer.

4. The cleaning system according to claim 1, wherein the chaffer additionally comprises a first side and a second side extending between the upstream extremity and the downstream extremity, and the transverse opening extends between a first end of the chaffer dam proximate to the first side of the chaffer and a second end of the chaffer dam proximate to the second side of the chaffer.

5. A cleaning system for an agricultural combine, comprising:
   a cleaning shoe including a chaffer vertically spaced over an underlying grain sieve and having a first side and a second side extending between an upstream extremity and a downstream extremity;
   a cleaning fan for establishing a flow of air upwardly through the chaffer; and
   a chaffer dam proximate to and extending upwardly relative to the downstream extremity and extending transversely from a first end mounted to the first side of the chaffer to a second end mounted to the second side of the chaffer, the chaffer dam transversely obstructing a crop layer flow path extending over the chaffer from the upstream extremity to the downstream extremity while permitting air and threshed crop material to flow thereover and thereunder through a an opening between the chaffer dam and the downstream extremity and that extends transversely between the first end of the chaffer dam and the second end of the chaffer dam.

6. The cleaning system according to claim 5, wherein the chaffer dam is longitudinally straight and perpendicular to the crop layer flow path between the first end and the second end.

7. In a cleaning system for an agricultural combine comprising a cleaning shoe including a chaffer vertically spaced over an underlying grain sieve and having a upstream extremity and a downstream extremity, and a cleaning fan for establishing a flow of air upwardly through the chaffer, a method comprising mounting a chaffer dam transversely proximate to and extending upwardly relative to the downstream extremity, the chaffer dam transversely obstructing a crop layer flow path extending over the chaffer from the upstream extremity to the downstream extremity while permitting air and threshed crop material to flow thereover and thereunder through a transverse opening between the chaffer dam and the downstream extremity.

8. The method according to claim 7, wherein the chaffer dam is longitudinally straight and perpendicular to the crop layer flow path.

9. The method according to claim 7, wherein the step of mounting the chaffer dam comprises mounting the chaffer dam directly to the chaffer.

10. The method according to claim 7, wherein the chaffer additionally comprises a first side and a second side extending between the upstream extremity and the downstream extremity, and the transverse opening extends between a first end of the chaffer dam proximate to the first side of the chaffer and a second end of the chaffer dam proximate to the second side of the chaffer.

11. In a cleaning system for an agricultural combine comprising a cleaning shoe including a chaffer vertically spaced over an underlying grain sieve and having a first side and a second side extending between an upstream extremity and a downstream extremity, and a cleaning fan for establishing a flow of air upwardly through the chaffer, a method comprising transversely extending a chaffer dam proximate to and extending upwardly relative to the downstream extremity from a first end of the chaffer dam proximate to the first side of the chaffer to a second end of the chaffer dam proximate to the second side of the chaffer, the chaffer dam transversely obstructing a crop layer flow path extending over the chaffer from the upstream extremity to the downstream extremity while permitting air and threshed crop material to flow thereover and thereunder through an opening between the chaffer dam and the downstream extremity and that extends transversely between the first end of the chaffer dam and the second end of the chaffer dam.

12. The method according to claim 11, wherein the step of transversely extending the chaffer additionally comprises mounting the first end of the chaffer dam to the first side of the chaffer and mounting the second end of the chaffer to the second side of the chaffer.

13. The method according to claim 11, wherein the chaffer dam is longitudinally straight and perpendicular to the crop layer flow path between the first and second end.

\* \* \* \* \*